United States Patent

[11] 3,632,084

[72] Inventor Roger Louis Ripert
   Concord, Calif.
[21] Appl. No. 50,738
[22] Filed June 29, 1970
[45] Patented Jan. 4, 1972
[73] Assignee Grove Valve and Regulator Company

[54] FABRICATED VALVE BODY CONSTRUCTION
   7 Claims, 2 Drawing Figs.
[52] U.S. Cl.................................................. 251/329,
   220/3
[51] Int. Cl................................................... F16k 3/00
[50] Field of Search............................................ 251/329;
   220/10, 3; 137/262, 265

[56] References Cited
   UNITED STATES PATENTS

| | | | |
|---|---|---|---|
| 2,341,044 | 2/1944 | Jackson et al. | 220/3 |
| 2,672,254 | 3/1954 | Boardman | 220/3 X |
| 3,386,151 | 6/1968 | Combes | 251/329 X |

*Primary Examiner*—Arnold Rosenthal
*Attorney*—Melvin R. Stidham

ABSTRACT: A valve body fabricated from rolled shapes with end walls being reinforced by circular, dished members having spherical surfaces. The reinforcing circular members are welded around their circumferences to the end walls, and holes are formed through the end walls within the area circumscribed by the weld, to expose the spherical concave surfaces to internal fluid pressures.

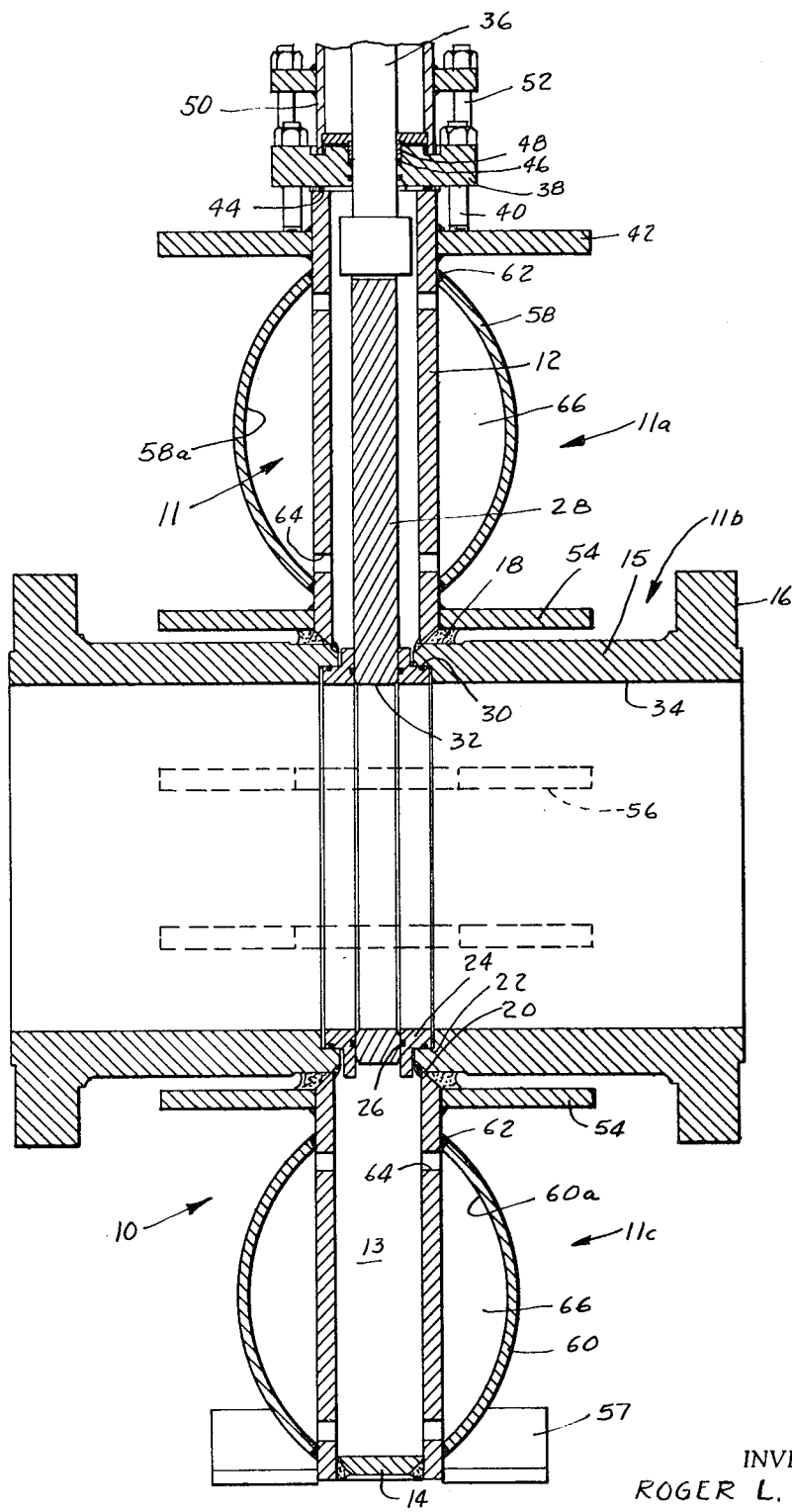

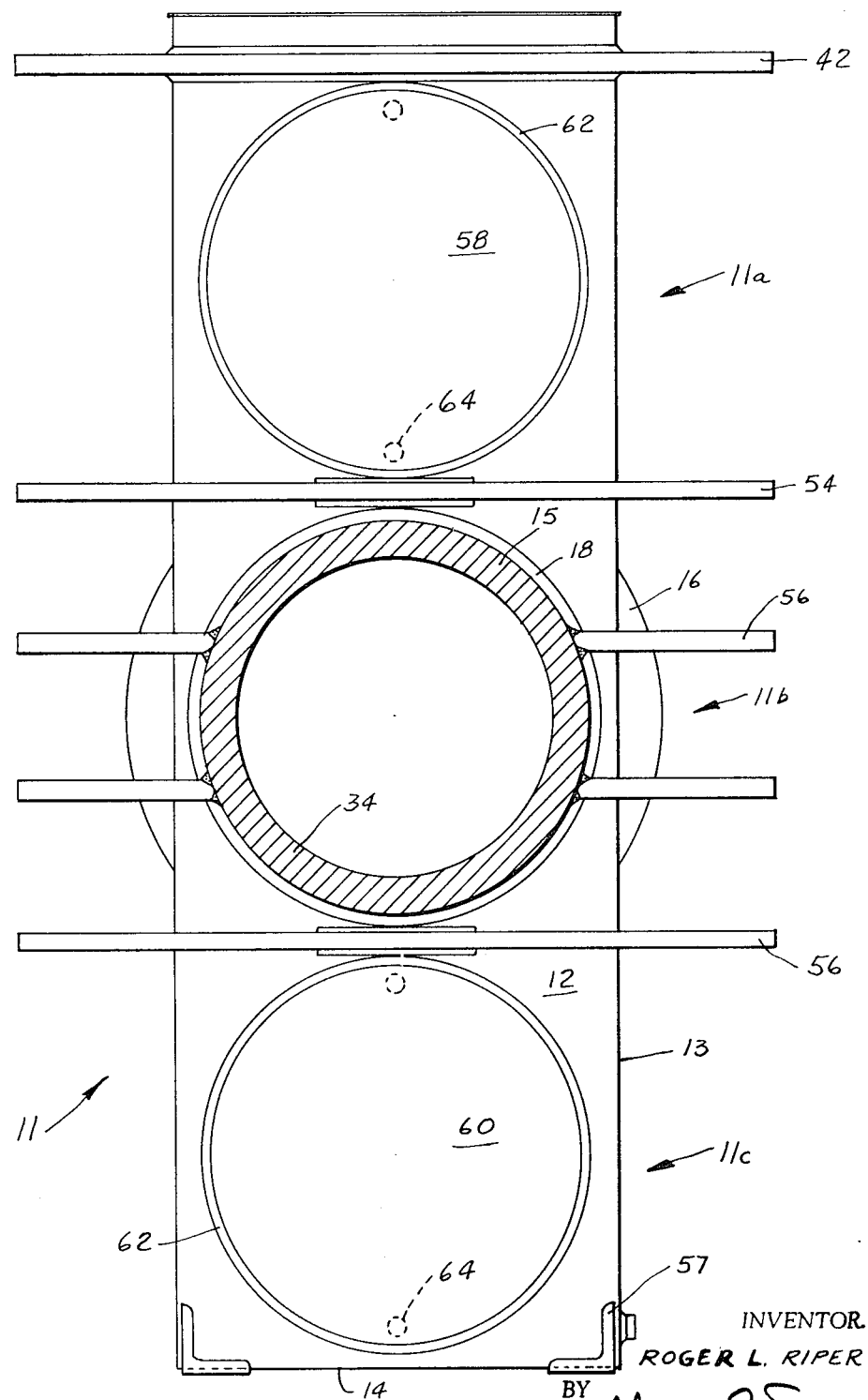

FABRICATED VALVE BODY CONSTRUCTION

BACKGROUND OF THE INVENTION

This invention relates to a fabricated valve body construction and, more particularly to a valve body fabricated by welding rolled shapes together and reinforcing them against internal fluid pressures.

Gate and ball valves, the bodies of which are fabricated from plates, angles or channels welded together have, in recent years, become very well received in the pipeline industry. A gate valve of this type is described and claimed in U.S. Pat. No. 2,982,514, granted May 2, 1961 to Austin U. Bryant. The gate valve described therein comprises a boxlike body formed of angles and plates welded together with a plurality of hooplike plates or ribs secured around the body for reinforcement against internal pressure.

While gate valves of this type have been tremendously successful and well received, the number of reinforcing ribs required in some sizes and pressure classes renders both the amount of steel and the welding labor costs excessive.

Another commercially successful gate valve is formed by expanding a relatively flat circular or oval cylindrical enclosure under pressure, whereby the opposing walls assume a spherical configuration for improved strength to weight ratio. Then a segment of the enclosure is cut away and the major portion is welded to a flange to form a lightweight valve bonnet. Gate valves of this type are described and claimed in U.S. Pat. No. 3,353,786, granted Nov. 21, 1967 to Marvin G. Combes. These valves have also been highly successful but the number of construction steps involved in forming the enclosure, expanding it an then severing it do add considerably to the labor costs.

OBJECTS OF THE INVENTION

It is an object of this invention to provide a fabricated valve body of minimum weight.

It is a further object of this invention to provide a fabricated valve body having maximum strength to weight ratio.

It is a further object of this invention to provide a fabricated valve body with welded reinforcement requiring a minimum of welding labor.

It is a further object of this invention to provide a pressure vessel utilizing the inherent structural strength of the sphere.

It is a further object of this invention to fabricate a valve body with readily available rolled metal shapes and still achieve the structural strength of a sphere.

Other objects and advantages of the invention will become apparent from the detailed description to follow when read in conjunction with the accompanying drawing.

BRIEF SUMMARY OF THE INVENTION

In carrying out this invention, a valve body is fabricated by welding together angles, plates or other rolled shapes into a boxlike tubular configuration. Welded to each flat end wall above and below the flow passageway hubs are reinforcing members, each comprising a circular member of steel or the like, which is dished to form a spherical segment, with the concave inner wall exposed to internal fluid pressures through holes drilled through the wall within the area of the circular reinforcement. The reinforcements are secured to the end wall by welding around their circumferences whereby the reinforcement member becomes an integral part of the pressure vessel. The valve body is constituted essentially of three sections, i.e., the central hub section and the top and bottom sections. The circular reinforcements strength the top and bottom sections supplemented by reinforcing means above and below them. The hub section is strengthened by ribs.

BRIEF DESCRIPTION OF THE DRAWING

FIG. 1 is a vertical section view of a gate valve body embodying features of the invention; and FIG. 2 is an end view of the gate valve body with a portion of one hub removed.

DESCRIPTION OF A PREFERRED EMBODIMENT

Referring to the drawing with greater particularity, the gate valve 10 comprises a body tube 11 of generally rectangular horizontal cross section, having opposing end walls and sidewalls 12 and 13. The body tube 11 may be formed as described in the aforesaid U.S. Pat. No. 2,982,514. The body is formed of angles or other rolled shapes which are welded together into rectangular, tubular configuration, the lower end being closed by a bottom wall 14. Cylindrical hubs 15 with raised face flanges 16 or other means for connecting it into a pipeline, are welded at 18 into circular openings 20 provided in the opposing end walls 12. Annular recesses 22 are counterbored into the inner ends of the hubs 15 in order to accommodate seal ring assemblies 24 which may include a resilient seal ring 26 carried in the leading face to seal against the gate 28. A tail O-ring 30 seals around and between trailing portions of the seal ring and the wall of the recess 22.

The gate illustrated 28 is of the through conduit type with a circular opening or port 32 therein which in the open position shown is aligned with the fluid passages 34 in the opposing hubs. In closed position, the gate port 32 is received in the lower portion 11c of the body below the hubs 15.

A stem 36, which is attached to the upper end of the gate 28 is slidably received in a bonnet plate 38. The bonnet plate is secured in place by means of studs 40 threaded into a hooplike reinforcing rib 42 around the upper end of the body tube 11. Suitable gasket means 44 seal off the valve bonnet 38. An O-ring 46 or other suitable stem-sealing means held in place by a packing gland 48 provides a seal around a stem 36. An operator of any suitable type (not shown) may be carried on a yoke 50 which is secured in place by bolting it at 52 to the bonnet plate 38.

Intermediate reinforcing ribs 54 are welded around the body tube 11 on opposite sides of the hubs 15 and partial ribs 56 are welded across the ends and sides, 12 and 13, of the body tube 11 adjacent the hubs 12. Feet 57 may be welded to the lower end of the body tube 11.

Welded to the opposing end walls 12 of the body tube 11 over considerable portions of their areas in the sections 11a and 11c, respectively, the hubs 15 are circular, dished reinforcing members 58 and 60 formed as spherical segments. The reinforcing members 58 and 60 are welded at 62 around their circumferences to secure them firmly in place and to render them fluidtight. Holes 64 are bored through the end walls 12 within the areas circumscribed by the the welds 62 so that internal pressures to which the valve may be subjected are asserted directly against the spherical concave inner surfaces 58a and 60a of the reinforcing members. Preferably, one of the holes within each reinforcing member 58, and 60 is located adjacent the lowermost part of the circle in order to minimize the amount of fluid that may accumulate within the chambers 66 formed between the end walls and the reinforcing members 58 and 60.

Because the spherical surfaces 58a and 60a offer maximum resistance to internal pressure, the reinforcing members provide considerable strength, though relatively light in weight. They replace a considerable number of reinforcing ribs and therefore eliminate considerable welding time.

In addition, because the reinforcing members are of circular outline they may be welded very quickly and easily by automatic circular welders such as that illustrated in U.S. Pat. No. 2,777,973, granted Jan. 15, 1957 to Austin U. Bryant. By the same token, reinforcing members of the same curvature and thickness are suitable for a range of valve sizes in the same pressure class, a savings in inventory may be realized by ordering circular reinforcements of one diameter and then reducing the diameter as required in an automatic circular torch.

Essentially, the valve is made up of three sections 11a, 11b and 11c, each approximately square in outline. The central section 11b is occupied by the hubs 15 and, since there can be no provision for a circular reinforcement 58 or 60, the partial hoop ribs 56 are required across the midsection 11b. On the upper section 11a, the sphere segment reinforcing members 58 are secured to take the bulk of the internal pressure load. Under pressure, the sphere segments tend to constrict, and some of the load is transferred in compression to that area of the end walls 12 within the circle. The areas outside the circle under internal pressure are supported at the sides by the sidewalls 13 and at the top and bottom by reinforcing ribs 42 and 54. Because the sections 11a and 11c are substantially square the span of end wall 12 subjected to stresses outside the circular welds 16 is substantially equal at 90°.

In the bottom section 11c, the spherical segment 60 also takes the bulk of the internal load, transferring part of the load to the wall 12 in compression. The areas outside the circular weld 62 are supported by the sidewalls 13 and the bottom wall 14 and, at the upper end of the section 11c by the reinforcing rib 54.

While this invention has been described in conjunction with a preferred embodiment thereof, it is obvious that modifications and changes therein may be made by those skilled in the art without departing from the spirit and scope of this invention.

What is claimed is:
1. A pressure vessel comprising:
a pair of relatively flat, generally parallel end walls,
a pair of sidewalls interconnecting said end walls,
a dished reinforcing plate comprising a spherical section less than a hemisphere with a concave spherical inner surface overlying each of said end walls, and welded around it circumference thereto,
port means through said end walls within the areas covered by said dished plates.
2. The pressure vessel defined by claim 1 including:
aligned flow passages through said end walls, and
a flow-blocking gate movable in said vessel to block and unblock said flow passages,
said dished plates being welded to said end walls in a section thereof above said flow passages.
3. The pressure vessel defined by claim 2 wherein:
said gate has an opening therethrough movable from a position on one side of said flow passages to a position in alignment therewith and a flow-blocking portion movable from a position in alignment with said flow passages to a position on the other side thereof, and
a second pair of said dished plates welded to said end walls below said flow passages.
4. The pressure vessel defined by claim 2 including:
reinforcing members above and below said dished plates to resist internal pressures in said vessel.
5. The pressure vessel defined by claim 2 wherein:
said section of the end walls is substantially square and including:
reinforcing members above and below said dished plates to resist internal pressures in said vessel.
6. The pressure vessel defined by claim 5 wherein:
the reinforcing member below said dished plates is a hooplike rib secured around said vessel.
7. The pressure vessel defined by claim 5 including:
a plurality of reinforcing members embracing said end walls and sidewalls adjacent said flow passages.

* * * * *